UNITED STATES PATENT OFFICE.

DENIS MANIVET, OF MARSEILLE, AND EMILE RESSEGAIRE, OF AVIGNON, FRANCE.

ARTIFICIAL SKIN OR GUT ENVELOP FOR SAUSAGE-MEAT OR THE LIKE.

1,076,899.     Specification of Letters Patent.     Patented Oct. 28, 1913.

No Drawing.     Application filed October 4, 1911. Serial No. 652,817.

*To all whom it may concern:*

Be it known that we, DENIS MANIVET, residing at 66ᴬ Boulevard Chave, Marseille, France, and EMILE RESSEGAIRE, residing at 91 Rue Bonneterie, Avignon, France, both citizens of the French Republic, have invented new and useful Improvements in Artificial Skin or Gut Envelops for Sausage-Meat or the like, which is fully set forth in the following specification.

This invention relates to artificial skin or gut forming a substitute for the natural gut of animals as envelop for sausage meat, salted provisions and the like.

The invention consists in an improved artificial skin or gut constituted of an impermeable element of suitable proteic material preserved and rendered insoluble in boiling water by known processes, and a stress resisting element embedded in the first element and consisting of thread netting. This artificial reinforced skin has the advantage over the natural product of offering greater resistance to puncturing during the process of stuffing or filling and since it is used in the dry state it does not introduce any dampness in the substance it contains and consequently does not give rise to any injurious fermentation in the contents. The improved envelop also gives the contents which are usually in the form of mincemeat better lasting properties, rendering them absolutely non-putrescent; it does not require any tying up owing to the strength which it possesses, and is of uniform diameter, therefore more agreeable to the eye. The improved envelop possesses the advantages over fabric substitutes which have hitherto been unsuccessfully tried in place of the natural gut, of remaining always impermeable to air and of not being hygroscopic, which qualities insure on the one hand that the grease in contact with the envelop does not become rancid, and on the other hand the contents are protected from too prolonged humidification and consequent rapid softening and deterioration.

In carrying the invention into practice the netting of thread is prepared in plane or tubular form and immersed in a solution of casein, whereby the thread is embedded in a film of the casein. Molds may be used for this immersion. In every case the casein after being fixed and rendered insoluble, constitutes the impermeable element of the artificial skin or gut and the netting the stress resisting member. The casein may be replaced by gelatin, albumen, or other proteic substances rendered preservative and insoluble in boiling water by any known processes.

The threads employed for the netting reinforcements are of vegetable, animal, mineral or other origin, hemp threads being very suitable. The threads of the netting may cross each other at any angle but preferably at right angles and may be either knotted or simply interlaced at their points of crossing. When the netting is plane the longitudinal edges of the skin or membrane in which it is embedded are sewn, gummed or otherwise joined so as to form a tubular envelop. The tubular form of the netting reinforcement is preferable since no final joining of the edges is necessary.

The improved artificial envelop constructed in the manner hereinbefore described has the following qualities: Great resistance to pulling forces, enabling filling or stuffing with the food contents without fear of rupture. Has perfect keeping qualities without special precautions having to be taken, and is of small bulk. Is inodorous and tasteless so that no smell or flavor is communicated to the contents. Is impermeable to air and moisture which protects the contents from becoming rancid. May be used in the dry state which protects the contents from softening. Contracts and adheres to the products obtained. Does not require any tying up and is of uniform diameter. Allows common salt and other salts contained in the product inclosed to penetrate through the envelop by exosmosis, thus forming an external "bloom".

Having now described our invention what we claim as new and desire to secure by Letters Patent is:—

1. An artificial skin for wrapping sausage meat and the like characterized by being impermeable, non-hygroscopic and adapted to be applied in a dry state, said skin consisting of a body of protein material rendered preservative and insoluble in boiling water and containing a stress resisting fabric of netting embedded in said material.

2. An artificial skin or gut for enveloping sausage meat and the like comprising, an impermeable element of casein rendered preservative and insoluble in boiling water, and a stress resisting element of thread netting embedded in the first element.

In testimony whereof we have signed this specification in the presence of two subscribing witnesses.

DENIS MANIVET.
EMILE RESSEGAIRE.

Witnesses:
J. PAQUEL,
J. LAUPIES.